United States Patent
Kanno et al.

(10) Patent No.: US 8,089,023 B2
(45) Date of Patent: Jan. 3, 2012

(54) ARC-EXTINGUISHING PROCESSED RESIN ARTICLE AND CIRCUIT BREAKER THAT USES SAME

(75) Inventors: Toshiyuki Kanno, Kawasaki (JP);
Hironori Yanase, Kawagoe (JP);
Shuichi Sugiyama, Ichihara (JP)

(73) Assignee: Fuji Electric FA Components & Systems Co., Ltd.

( * ) Notice: Subject to any disclaimer, the term of this patent is extended or adjusted under 35 U.S.C. 154(b) by 511 days.

(21) Appl. No.: 12/367,489

(22) Filed: Feb. 6, 2009

(65) Prior Publication Data

US 2009/0200272 A1    Aug. 13, 2009

(30) Foreign Application Priority Data

Feb. 8, 2008  (JP) .................................. 2008-028577

(51) Int. Cl.
*H01H 33/04* (2006.01)
(52) U.S. Cl. ........................... 218/158; 218/85; 218/150
(58) Field of Classification Search ................... 218/85, 218/150, 158
See application file for complete search history.

(56) References Cited

U.S. PATENT DOCUMENTS

| | | | |
|---|---|---|---|
| 5,463,199 A * | 10/1995 | Divincenzo et al. ........... | 218/158 |
| 5,753,877 A * | 5/1998 | Hartzel et al. ................ | 218/157 |
| 5,841,088 A | 11/1998 | Yamaguchi et al. | |
| 6,046,258 A | 4/2000 | Katsube et al. | |
| 6,361,848 B1 | 3/2002 | Katsube et al. | |
| 2007/0145338 A1 | 6/2007 | Zakikhani | |
| 2009/0283500 A1 | 11/2009 | Yanase et al. | |

FOREIGN PATENT DOCUMENTS

| | | |
|---|---|---|
| DE | 10 2007 055 667 A1 | 5/2008 |
| DE | 10 2007 055 644 A1 | 6/2008 |
| EP | 1 475 817 A1 | 11/2004 |

(Continued)

OTHER PUBLICATIONS

Preliminary Search Report issued in corresponding French Patent Application No. 0900461 dated Feb. 7, 2011.

(Continued)

*Primary Examiner* — Truc Nguyen
(74) *Attorney, Agent, or Firm* — Rossi, Kimms & McDowell LLP

(57) ABSTRACT

An arc-extinguishing processed resin article is disclosed that exhibits an excellent arc-extinguishing behavior, heat resistance, pressure resistance, and molding processability, and a circuit breaker that uses this arc-extinguishing processed resin article are provided. The circuit breaker includes a stationary contactor that has a stationary contact point, a movable contactor that has a movable contact point contacting the stationary contactor and that carries out a switching operation with the stationary contactor, and an arc-extinguishing device that extinguishes the arc generated when the stationary contactor and movable contactor engage in a switching operation. The circuit breaker uses, as the arc-extinguishing device, an arc-extinguishing processed resin article obtained by molding a resin composition containing (A) polyolefin resin that has the hydroxyl group substituted for a portion of the hydrogen atoms in the methylene chain and that contains 0.2 to 0.7 mole hydroxyl group per mole methylene group, (B) a crosslinking agent that has a terminal unsaturated group, and (C) metal hydroxide whose surface has been treated with higher aliphatic acid, wherein the resin composition contains 5 to 60 mass parts of the metal hydroxide (C) per 100 mass parts of the polyolefin resin (A), and radiation-induced crosslinking is executed on the resin composition after the molding thereof.

9 Claims, 2 Drawing Sheets

FOREIGN PATENT DOCUMENTS

| | | |
|---|---|---|
| EP | 1 739 109 A1 | 1/2007 |
| FR | 2931155 A1 | 11/2009 |
| JP | 62-252409 A | 11/1987 |
| JP | 2-256110 A | 10/1990 |
| JP | 05-271498 A | 10/1993 |
| JP | 7-302535 A | 11/1995 |
| JP | 8-171847 A | 7/1996 |
| JP | 3098042 B2 | 8/2000 |
| JP | 2004-182922 A | 7/2004 |
| WO | 03/044818 A1 | 5/2003 |

OTHER PUBLICATIONS

Notification of Reasons for Refusual issued in corresponding Japanese Patent Application No. 2008-028577 dated Jun. 29, 2010. Partial English translation provided.

* cited by examiner

ARC-EXTINGUISHING PROCESSED RESIN ARTICLE AND CIRCUIT BREAKER THAT USES SAME

BACKGROUND OF THE INVENTION

A. Field of the Invention

The present invention relates to a fire-retardant, arc-extinguishing, processed resin article used to extinguish the arc generated from contact points during an interruption in current flow, for example, by a circuit breaker. The present invention further relates to a circuit breaker that uses this fire-retardant arc-extinguishing processed resin article.

B. Description of the Related Art

In a circuit breaker, an arc is generated between contact points when the contact point on the movable contactor is separated from the contact point on the stationary contactor while an overcurrent or rated current is flowing therethrough. In order to extinguish this arc, an arc-extinguishing device is typically disposed on the periphery of the arc-generating region. This arc-extinguishing device is equipped with an arc-extinguishing chamber comprising an arc-extinguishing member. The arc-extinguishing member undergoes pyrolysis under the action of the arc, and the arc is then extinguished by the pyrolysis gas that is generated from the arc-extinguishing member.

Thermosetting resins, e.g., unsaturated polyester resin (Japanese Patent 3,098,042) and melamine resin (Japanese Patent Application Laid-open No. H02-256110), and thermoplastic resins, e.g., polyolefin resin, polyamide resin, and polyacetal resin (Japanese Patent Application Laid-open No. H07-302535 (U.S. Pat. No. 5,841,088)), are primarily used as the matrix resin in this arc-extinguishing member.

However, thermosetting resins are prone to burring during molding and thus have had a molding processability that is inferior to that of thermoplastic resins. In addition, the internal pressure within the arc-extinguishing device rises during arc extinction due to the generation of pyrolysis gas from the arc-extinguishing member. This has made it difficult to reduce the size of the arc-extinguishing device in the case of thermosetting resins, which have a poor pressure resistance.

Thermoplastic resins do resist burring during molding, but they have a poor strength, pressure resistance, and heat resistance and provide an arc-extinguishing member that tends to deform or deteriorate over time. On the other hand, thermoplastic resins that have a high aromatic ring content, such as aromatic polyamide resins, exhibit a relatively good strength, pressure resistance, and heat resistance, but they readily release free carbon during combustion. This has resulted in problems such as a potential carbon-mediated erosion of the arc-extinguishing device and a loss of the insulating characteristics of the arc-extinguishing device.

The addition of a metal hydroxide, e.g., magnesium hydroxide, aluminum hydroxide, and so forth, has also been tried in order to raise the arc-extinguishing performance of thermoplastic resins and thermosetting resins (Japanese Patent 3,098,042 and Japanese Patent Application Laid-open Nos. H02-256110, 07-302535 (U.S. Pat. No. 5,841,088), and 08-171847).

WO 2003/044818 discloses a circuit breaker that employs a processed resin article obtained by treating a thermoplastic resin, e.g., polyester or polyamide, with an electron beam.

Metal hydroxides undergo a dehydration reaction during pyrolysis with the generation of a pyrolysis gas that exhibits a high arc-extinguishing activity. Due to this, the addition of a metal hydroxide to the resin results in an elevated arc-extinguishing performance by the resulting processed resin article, as disclosed in the aforementioned Japanese Patent 3,098,042 and Japanese Patent Application Laid-open Nos. H02-256110, 07-302535 (U.S. Pat. No. 5,841,088), and 08-171847. However, metal hydroxides have a poor compatibility with, and a poor dispersibility in, resins. This is associated with the facile generation of dispersion defects, and as a consequence the resin composition has been prone to exhibit a poor molding processability. In addition, there has been a distinct tendency for fluctuations to be produced in the properties of the obtained processed resin article, for example, in the arc-extinguishing performance, strength, heat resistance, pressure resistance, and so forth.

As disclosed in WO 2003/044818, an improvement in, for example, the strength, heat resistance, and pressure resistance was seen when a crosslinking process was executed on thermoplastic resin. However, no improvement in the arc-extinguishing performance was seen. Moreover, there was also almost no inhibition of the internal pressure increase within the arc-extinguishing device due to the pyrolysis gas generated during arc extinction and the arc-extinguishing device was readily damaged by the internal pressure rise at the time of arc extinction.

SUMMARY OF THE INVENTION

It is desired, therefore, to provide an arc-extinguishing processed resin article that can produce a pyrolysis gas capable of very efficiently extinguishing the arc produced during circuit interruption, that exhibits a heat resistance capable of withstanding the temperature rise that occurs during this event, that exhibits a pressure resistance capable of withstanding the internal pressure rise that occurs during this event, and that also exhibits an excellent molding processability. It also is desired to provide a circuit breaker that uses this arc-extinguishing processed resin article.

In order to achieve these desired goals, the arc-extinguishing processed resin article of the present invention is obtained by: molding a resin composition comprising (A) polyolefin resin that has the hydroxyl group substituted for a portion of the hydrogen atoms in the methylene chain and that contains 0.2 to 0.7 mole hydroxyl group per mole methylene group, (B) a crosslinking agent that has a terminal unsaturated group, and (C) metal hydroxide whose surface has been treated with higher aliphatic acid, wherein the resin composition contains 5 to 60 mass parts of the metal hydroxide (C) per 100 mass parts of the polyolefin resin (A); and executing radiation-induced crosslinking on the resin composition after the molding thereof.

The arc-extinguishing processed resin article of the present invention has an excellent strength, heat resistance, and pressure resistance because the terminal unsaturated bond in the crosslinking agent (B) reacts with the polyolefin resin (A) under the action of the radiation to effect crosslinking into a three-dimensional network. Moreover, because the polyolefin resin (A) has a high hydroxyl content and because the OH group present in pendant position therein is readily dissociated by thermal degradation, a pyrolysis gas is produced that has a high content of hydrogen gas, $H_2O$, $O_2$, and O, thereby enabling a swift arc extinction. In addition, because this pyrolysis gas contains minimal amount of component that makes a weak contribution to arc extinction (e.g., tar fraction), the internal pressure within the arc-extinguishing device can be restrained. Furthermore, since it is difficult for carbon to attach to the arc-extinguishing device during arc extinction, the arc-extinguishing device is resistant to a loss of its insulating characteristics. The metal hydroxide (C) also exhibits an improved compatibility with, and dispersibility in, the resin due to the surface treatment with higher aliphatic acid, and can therefore be easily dispersed to uniformity in the resin composition by melt-mixing/kneading, which results in an excellent molding processability.

The metal hydroxide (C) in the arc-extinguishing processed resin article of the present invention is preferably magnesium hydroxide. During a pyrolysis event, magnesium hydroxide produces a pyrolysis gas that has a high content of hydrogen gas, $H_2O$, $O_2$, and O, thereby enabling an even more rapid arc extinction.

The aliphatic acid used for the surface treatment of the metal hydroxide (C) in the arc-extinguishing processed resin article of the present invention is preferably a $C_{12-20}$ aliphatic acid.

The latent heat of decomposition of the polyolefin resin (A) in the arc-extinguishing processed resin article of the present invention is preferably at least 30 cal/g.

The polyolefin resin (A) in the arc-extinguishing processed resin article of the present invention is preferably an ethylene-vinyl alcohol copolymer.

The crosslinking agent (B) for the arc-extinguishing processed resin article of the present invention preferably comprises an organophosphorus compound having the following formula (I) and/or formula (II), wherein the resin composition preferably contains 0.5 to 20 mass % of this organophosphorus compound:

[C1]

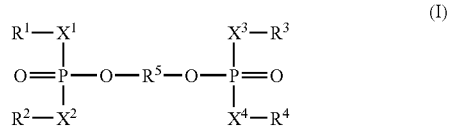

(in formula (I), $R^1$ to $R^4$ each represent $CH_2=CY^1—Y^2—$ or a possibly heteroatom-containing monovalent aromatic hydrocarbon group; $R^5$ represents a possibly heteroatom-containing divalent aromatic hydrocarbon group; $X^1$ to $X^4$ each represent a group selected from —O—, —NH—, and —($CH_2=CY^1—Y^2$)N—, at least one of $X^1$ to $X^4$ comprises —NH— or —($CH_2=CY^1—Y^2$)N—; at least two of $R^1$ to $R^4$ and $X^1$ to $X^4$ comprise $CH_2=CY^1—Y^2—$; $Y^1$ represents hydrogen or methyl; $Y^2$ represents $C_{1-5}$ alkylene or —COO—$Y^3$—; and $Y^3$ represents $C_{1-5}$ alkylene)

[C2]

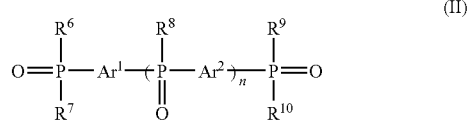

(in formula (II), at least one P—C bond is present per molecule; $Ar^1$ and $Ar^2$ each represent a divalent aromatic hydrocarbon group that has no more than 20 carbons and that does not contain mobile hydrogen; n is an integer from 0 to 2; $R^6$ to $R^{10}$ each represent a group selected from —$NHCH_2CH=CH_2$, —$N(CH_2CH=CH_2)_2$, —$OCH_2CH=CH_2$, —$CH_2CH=CH_2$, —$CH_2CH_2OCH=CH_2$, —($C_6H_4$)—$CH=CH_2$, —$O(C_6H_4)$—$CH=CH_2$, —$CH_2(C_6H_4)$—$CH=CH_2$, —$NH(C_6H_4)$—$CH=CH_2$, —$N(CH_2CH=CH_2)$—($C_6H_4$)—$CH=CH_2$, —O—R—OOC(R')=$CH_2$, —NH—R—NHCO—C(R')=$CH_2$, and aryl having no more than 12 carbons; R represents $C_{2-5}$ alkylene; R' represents hydrogen or methyl; and at least two of $R^6$ to $R^{10}$ comprise —$CH=CH_2$ or —$C(CH_3)=CH_2$).

The organophosphorus compounds described above, because they contain at least one phosphorus atom in each molecule, readily produce the strongly flame-retardant P radical during combustion, and the organophosphorus compound that contains the readily dissociable P—C bond even more readily produces the strongly flame-retardant P radical. The flame retardancy of the processed resin article thus can be raised by using the organophosphorus compounds described above. Moreover, because these organophosphorus compounds are incorporated in the resin through a crosslinking reaction with the resin, bleed out of the flame retardant component is inhibited and an excellent flame retardancy can be manifested over a long period of time. In addition, since the organophosphorus compounds described above have high molecular weights and are also energetically stable, they resist volatilization and heat- and shear-induced degradation during mixing/kneading into the resin and during molding of the resin and thus also do not cause a loss of molding processability.

The crosslinking agent (B) for the arc-extinguishing processed resin article of the present invention preferably contains flame retardant comprising a cyclic nitrogenous compound that has at least two unsaturated group at the terminals thereof, and the content of this nitrogenous compound in the resin composition is preferably 0.5 to 7 mass %. The presence of this nitrogenous compound improves the flame retardancy of the processed resin article. Moreover, because it is incorporated in the resin through a crosslinking reaction with the resin, bleed out of the flame retardant component is inhibited and an excellent flame retardancy can be manifested over a long period of time. Because this compound contains nitrogen, it has an even better compatibility with the resin in particular when a polyamide resin is used for the resin.

The resin composition for the arc-extinguishing processed resin article of the present invention also preferably contains 1 to 40 mass % of at least one inorganic filler (D) selected from glass fibers, barium titanate whiskers, microparticulate silica gel, boehmite, talc, and magnesium carbonate. This embodiment can provide an improved strength and pressure resistance for the processed resin article.

The circuit breaker according to the present invention comprises a stationary contactor that has a stationary contact point, a movable contactor that has a movable contact point capable of contacting the stationary contactor and that carries out a switching operation with the stationary contactor, and an arc-extinguishing device that extinguishes the arc generated when the stationary contactor and movable contactor engage in a switching operation, wherein the arc-extinguishing device comprises an arc-extinguishing processed resin article as described hereinabove.

The circuit breaker of the present invention provides a very efficient extinction of the arc generated from the contact points during a current interruption event and can restrain the increase in internal pressure within the arc-extinguishing device. This results in a downsized circuit breaker that exhibits an excellent interrupt performance, for example, with regard to an overload interrupt or short-circuit interrupt.

The arc-extinguishing processed resin article of the present invention has an excellent strength, pressure resistance, heat resistance, and molding processability, and also produces a pyrolysis gas that has a strong arc-extinguishing action and can therefore very efficiency extinguish the arc generated from the contact points during a current interruption event and can restrain the increase in internal pressure within the arc-extinguishing device. As a result, the circuit breaker of the present invention, which employs this arc-extinguishing processed resin article, is can be downsized and exhibits an excellent interrupt performance, for example, with regard to an overload interrupt or a short-circuit interrupt.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The Resin Composition

Figure 1:
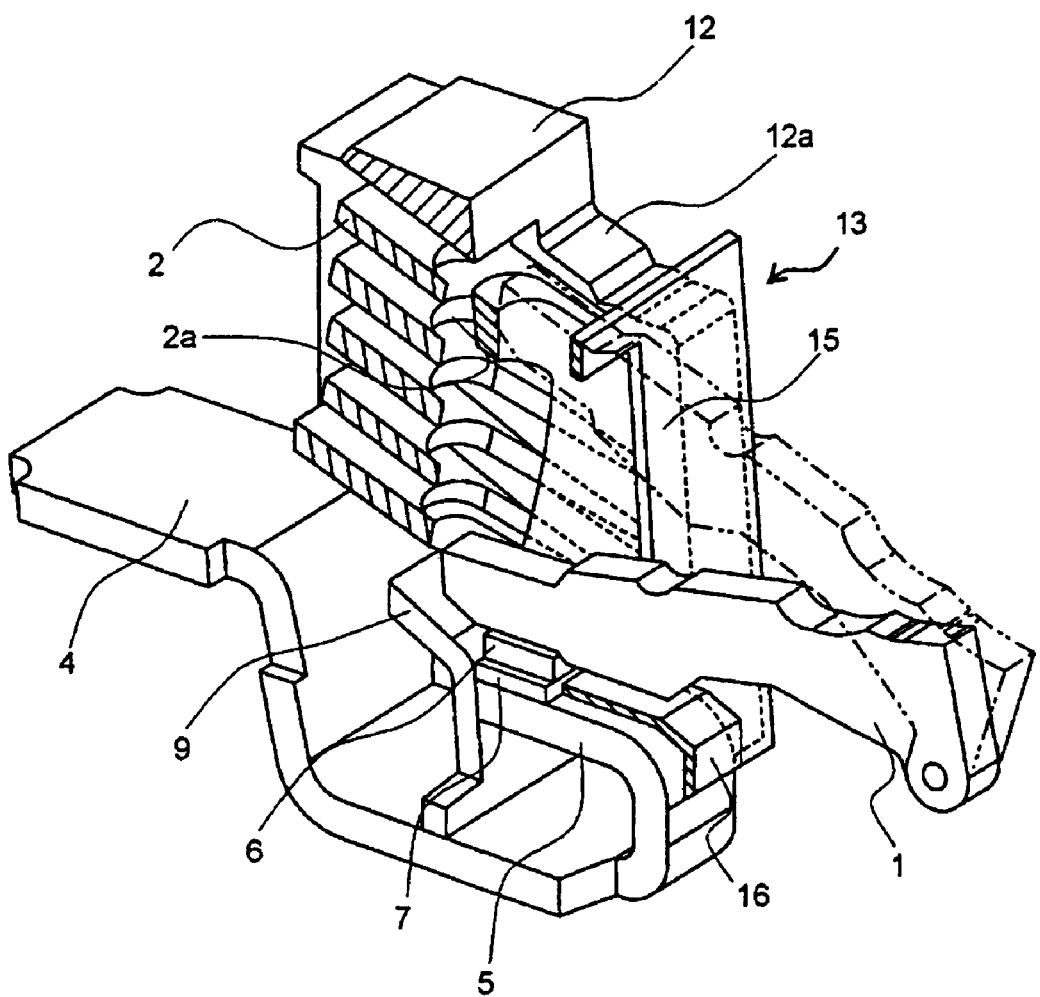
FIG. 1 is an example that shows a perspective cutaway view of a circuit breaker of the present invention.

The resin composition used for the arc-extinguishing processed resin article of the present invention will be described first. This resin composition comprises (A) polyolefin resin that has the hydroxyl group substituted for a portion of the hydrogen atoms in the methylene chain and that contains 0.2 to 0.7 mole hydroxyl group per mole methylene group, (B) crosslinking agent that has a terminal unsaturated group, and (C) metal hydroxide whose surface has been treated with higher aliphatic acid.

The Polyolefin Resin (A)

The resin composition used for the arc-extinguishing processed resin article of the present invention contains (A) polyolefin resin that contains 0.2 to 0.7 mole hydroxyl group per mole methylene group. This polyolefin resin (A) preferably contains 0.2 to 0.65 mole hydroxyl group per mole methylene group. When this hydroxyl group proportion is less than 0.2, this impairs the production during pyrolysis of pyrolysis gas that exhibits an excellent arc-extinguishing capacity and thereby prevents rapid arc extinction. In addition, there is a tendency when this hydroxyl group proportion is less than 0.2 for a large internal pressure to occur within the arc-extinguishing device during arc extinction. When the cited hydroxyl group proportion exceeds 0.7, a trend of declining heat resistance and declining thermal degradation temperature is entered, which tends to impede molding by melt-mixing.

The polyolefin resin (A) has a latent heat of decomposition preferably of at least 30 cal/g and more preferably of at least 40 cal/g. The latent heat of decomposition for polyolefin resin (A) may be raised by increasing the hydroxyl group content. For example, polyolefin resin in which the hydroxyl group has been substituted for a portion of the hydrogen atoms in the methylene chain to yield 0.2 to 0.7 mole hydroxyl group per mole methylene group, has a latent heat of decomposition of 30 to 50 cal/g. The latent heat of decomposition of a resin can be measured by carrying out the thermal decomposition of the resin to be measured in an inert atmosphere.

The polyolefin resin (A) has a hydroxyl group content preferably of 40 to 80 mole % and more preferably 68 to 76 mole %.

The polyolefin resin under consideration is preferably an ethylene-vinyl alcohol copolymer because this provides an excellent arc-extinguishing performance. Polyethylene provides a poorer arc-extinguishing performance than ethylene-vinyl alcohol copolymer, while there are limitations on the molding procedure with polyvinyl alcohol.

The Crosslinking Agent (B)

The resin composition used for the arc-extinguishing processed resin article of the present invention contains a crosslinking agent (B). This crosslinking agent (B) is a compound that has a terminal unsaturated group and that undergoes a crosslinking reaction with the resin when exposed to radiation, but is not otherwise particularly limited. Preferred examples include the following: at least difunctional, reactive functional group-containing compounds that lack an aromatic ring and that readily produce hydrogen gas, such as melamine-type trimethallyl acrylate and triallyl acrylate and isocyanate tri(methyl)acrylate (e.g., triallyl isocyanurate and trimethallyl isocyanurate and oligomers obtained by their radical oligomerization; triallyl trimellitate; trimethallyl ester trimellitate; tetraallyl pyromellitate; tetramethallyl pyromellitate; N,N,N',N',N'',N''-hexaallylmelamine; and N,N,N',N',N'',N''-hexamethallylmelamine), organophosphorus compounds given by formula (I) below (referred to below as a "reactive organophosphorus compound (b1)"), organophosphorus compounds given by formula (II) below (referred to below as a "reactive organophosphorus compound (b2)"), and a flame retardant comprising a cyclic nitrogenous compound that has at least two unsaturated groups at the terminals thereof (referred to below as a "reactive cyclic nitrogenous compound (b3)").

Among the preceding, the reactive organophosphorus compound (b1), the reactive organophosphorus compound (b2), and the reactive cyclic nitrogenous compound (b3) contain an unsaturated group and therefore bond and crosslink with the resin and also function as flame retardants themselves and thus have the ability to impart flame retardancy to the resulting processed resin molding, and the crosslinking agent (B) therefore more preferably comprises at least one selection from the reactive organophosphorus compounds (b1), the reactive organophosphorus compounds (b2), and the reactive cyclic nitrogenous compounds (b3), wherein the use of a reactive organophosphorus compound (b1) and/or a reactive organophosphorus compound (b2) in combination with a reactive cyclic nitrogenous compound (b3) is particularly preferred.

[C3]

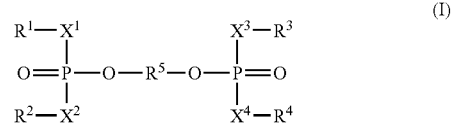

(I)

(In formula (I), $R^1$ to $R^4$ each represent $CH_2=CY^1-Y^2-$ or a possibly heteroatom-containing monovalent aromatic hydrocarbon group; $R^5$ represents a possibly heteroatom-containing divalent aromatic hydrocarbon group; $X^1$ to $X^4$ each represent a group selected from $-O-$, $-NH-$, and $-(CH_2=CY^1-Y^2)N-$ wherein at least two of $X^1$ to $X^4$ comprise $-NH-$ or $-(CH_2=CY^1-Y^2)N-$; at least one of $R^1$ to $R^4$ and $X^1$ to $X^4$ comprises $CH_2=CY^1-Y^2-$; $Y^1$ represents hydrogen or methyl; $Y^2$ represents $C_{1-5}$ alkylene or $-COO-Y^3-$; and $Y^3$ represents $C_{1-5}$ alkylene.)

[C4]

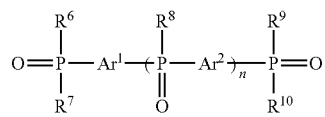
(II)

(In formula (II), at least one P—C bond is present per molecule; $Ar^1$ and $Ar^2$ each represent a divalent aromatic hydrocarbon group that has no more than 20 carbons and that does not contain mobile hydrogen; n is an integer from 0 to 2; $R^6$ to $R^{10}$ each represent a group selected from —NHCH$_2$CH=CH$_2$, —N(CH$_2$CH=CH$_2$)$_2$, —OCH$_2$CH=CH$_2$, —CH$_2$CH=CH$_2$, —CH$_2$CH$_2$OCH=CH$_2$, —(C$_6$H$_4$)—CH=CH$_2$, —O(C$_6$H$_4$)—CH=CH$_2$, —CH$_2$(C$_6$H$_4$)—CH=CH$_2$, —NH(C$_6$H$_4$)—CH=CH$_2$, —N(CH$_2$CH=CH$_2$)—(C$_6$H$_4$)—CH=CH$_2$, —O—R—OOC—C(R')=CH$_2$, —NH—R—NHCO—C(R')=CH$_2$, and aryl having no more than 12 carbons; R represents C$_{2-5}$ alkylene; R' represents hydrogen or methyl; and at least two of $R^6$ to $R^{10}$ comprise —CH=CH$_2$ or —C(CH$_3$)=CH$_2$.)

The CH$_2$=CY$^1$—Y$^2$— in formula (I) can be specifically exemplified by CH$_2$=CH—CH$_2$—, CH$_2$=CH—CH$_2$CH$_2$CH$_2$—, CH$_2$=C(CH$_3$)—CH$_2$—, CH$_2$=CHCOO—CH$_2$CH$_2$—, CH$_2$=C(CH$_3$)COO—CH$_2$CH$_2$—, and so forth.

The possibly heteroatom-containing monovalent aromatic hydrocarbon group encompassed by $R^1$ to $R^4$ in formula (I) is preferably a C$_{6-14}$ aromatic hydrocarbon group. It is specifically exemplified by —C$_6$H$_5$ (phenyl), —C$_6$H$_4$OH (hydroxyphenyl), —C$_6$H$_4$—C$_6$H$_4$OH (hydroxybiphenyl), —CH$_2$C$_6$H$_5$ (benzyl), -α-C$_{10}$H$_7$ (α-naphthyl), -β-C$_{10}$H$_7$ (β-naphthyl), and so forth.

The possibly heteroatom-containing divalent aromatic hydrocarbon group represented by $R^5$ in formula (I) is preferably a C$_{10-14}$ aromatic hydrocarbon group. It is specifically exemplified by -p-C$_6$H$_4$-p-C$_6$H$_4$—, -p-C$_6$H$_4$—CH$_2$-p-C$_6$H$_4$—, -p-C$_6$H$_4$—C(CH$_3$)$_2$-p-C$_6$H$_4$—, -p-C$_6$H$_4$—C(=O)-p-C$_6$H$_4$—, -p-C$_6$H$_4$—SO$_2$-p-C$_6$H$_4$—, 2,6-C$_{10}$H$_6$<(2,6-naphthylene), and so forth.

The aromatic hydrocarbon group cited for the present invention encompasses not only, for example, aromatic hydrocarbon groups such as the phenyl and -p-C$_6$H$_4$-p-C$_6$H$_4$— referenced above, but also encompasses, for example, groups that contain a heteroatom such as oxygen or sulfur in addition to containing an aromatic hydrocarbon group, such as the hydroxyphenyl and -p-C$_6$H$_4$—SO$_2$-p-C$_6$H$_4$— referenced above.

The compounds shown by the following structural formulas (I-1) to (I-18) are specific examples of the reactive organophosphorus group (b1).

[C5]

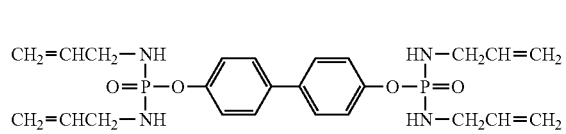
(I-1)

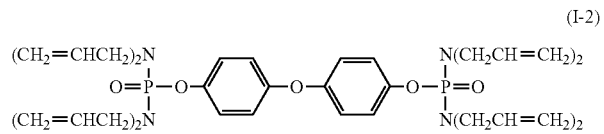
(I-2)

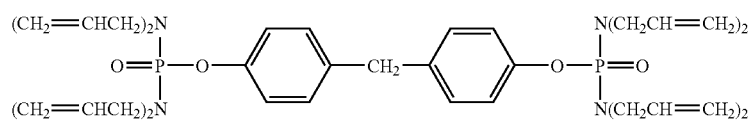
(I-3)

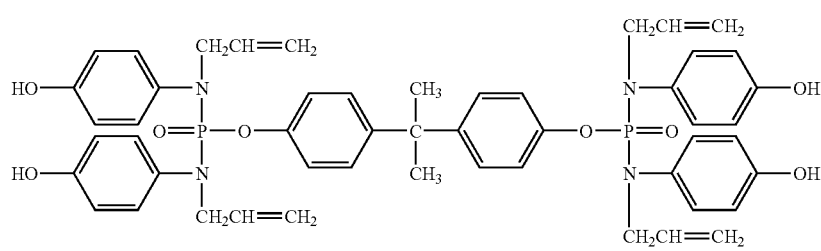
(I-4)

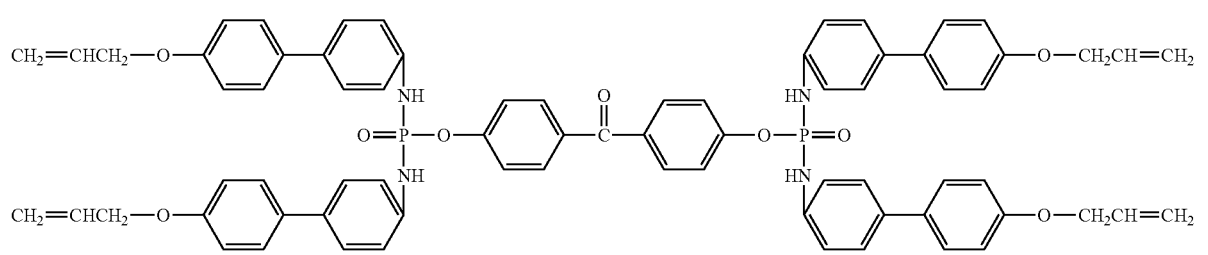
(I-5)

(I-6)
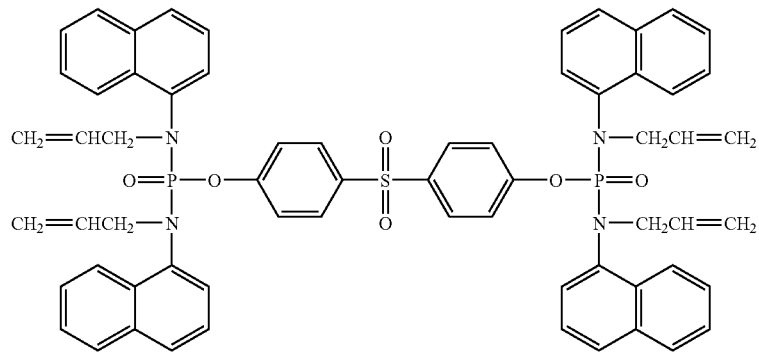
[C6]
(I-7)
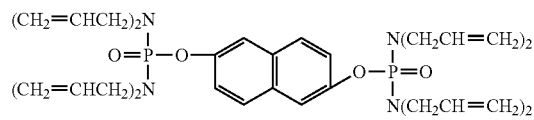
(I-8)
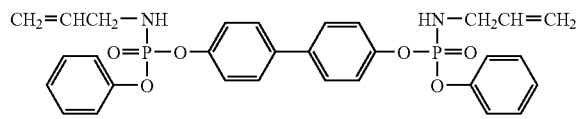
(I-9)
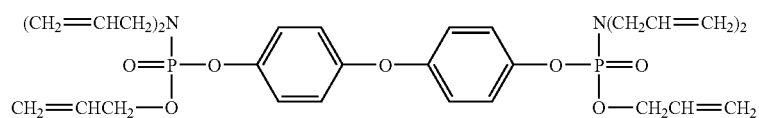
(I-10)
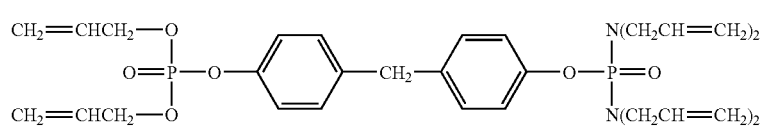
(I-11)
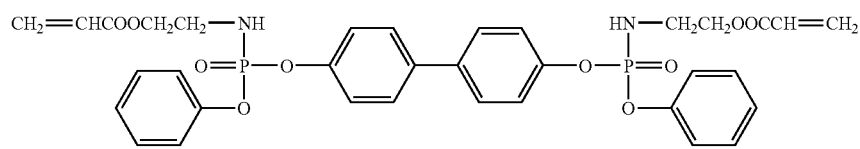
(I-12)
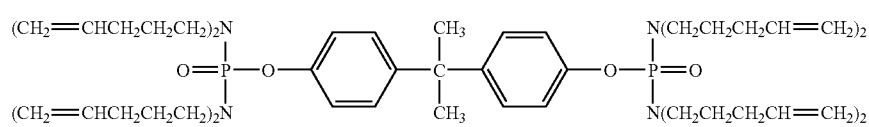
(I-13)
(I-14)
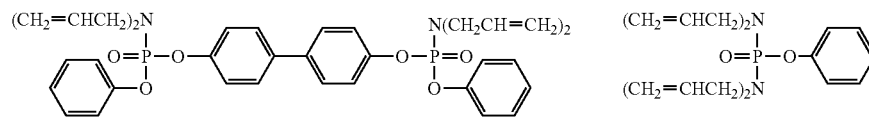
[C7]
(I-15)
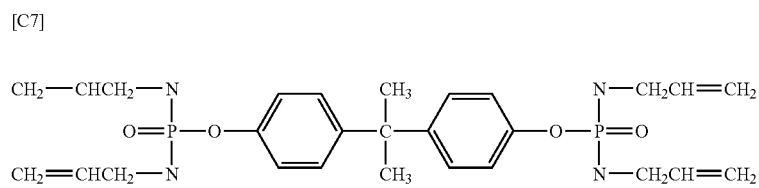
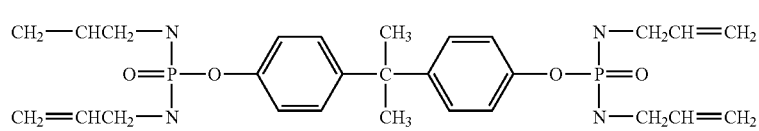
(I-16)
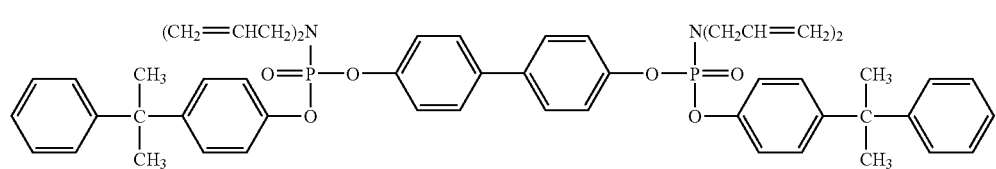

-continued

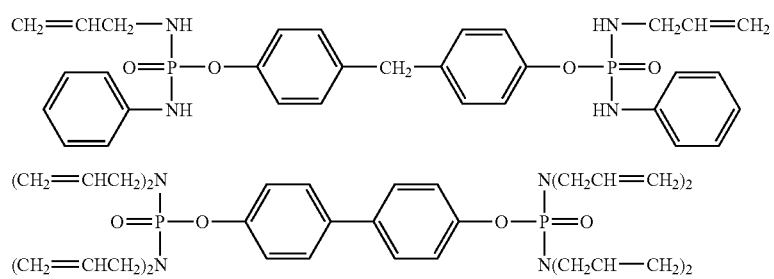

The compounds cited above can be synthesized by the method described in, for example, WO 2005/012415. For example, compound (I-1) can be obtained by adding phosphorus oxychloride to dimethylacetamide (DMAc); carrying out a reaction by the dropwise addition to the resulting solution of a DMAc solution in which 4,4'-biphenyl alcohol and triethylamine are dissolved; and then reacting a mixed solution of allylamine and triethylamine.

The aryl group containing no more than 12 carbons in formula (II) is exemplified by —$C_6H_5$ (phenyl), —$C_6H_4OH$ (hydroxyphenyl), —$C_6H_4$—$C_6H_4OH$ (hydroxybiphenyl), -α-$C_{10}H_7$ (α-naphthyl), —β—$C_{10}H_7$ (β-naphthyl), and so forth.

The divalent aromatic hydrocarbon group represented by $Ar^1$ and $Ar^2$ in formula (II) that has no more than 20 carbons and that does not contain mobile hydrogen is exemplified by -p-$C_6H_4$—, -p-$C_6H_4$—O—, —O-p-$C_6H_4$—O—, -p-$C_6H_4$-p-$C_6H_4$—, -p-$C_6H_4$—$CH_2$-p-$C_6H_4$—, -p-$C_6H_4$—$C(CH_3)_2$-p-$C_6H_4$—, -p-$C_6H_4$—C(=O)-p-$C_6H_4$—, -p-$C_6H_4$—$SO_2$-p-$C_6H_4$—, 2,6-$C_{10}H_6$<(2,6-naphthylene), and so forth. Here, mobile hydrogen denotes highly reactive hydrogen present in a functional group, which readily forms a hydrogen bond and which readily reacts at ambient temperature with, for example, sodium metal or sodium hydride, to form hydrogen; examples are —OH (the hydroxyl group), —NHCO— (the amide bond), and —NHCOO— (the urethane bond).

The compounds shown by structural formulas (II-1) to (II-23) below are specific examples of the reactive organophosphorus compound (b2). Among these, (II-1) to (II-12) are examples of the case of n=0, i.e., two phosphorus atoms are present in each molecule. (II-13) to (II-20) are examples of the case of n=1, i.e., three phosphorus atoms are present in each molecule. (II-21) to (II-23) are examples of the case of n=2, i.e., four phosphorus atoms are present in each molecule.

[C8]

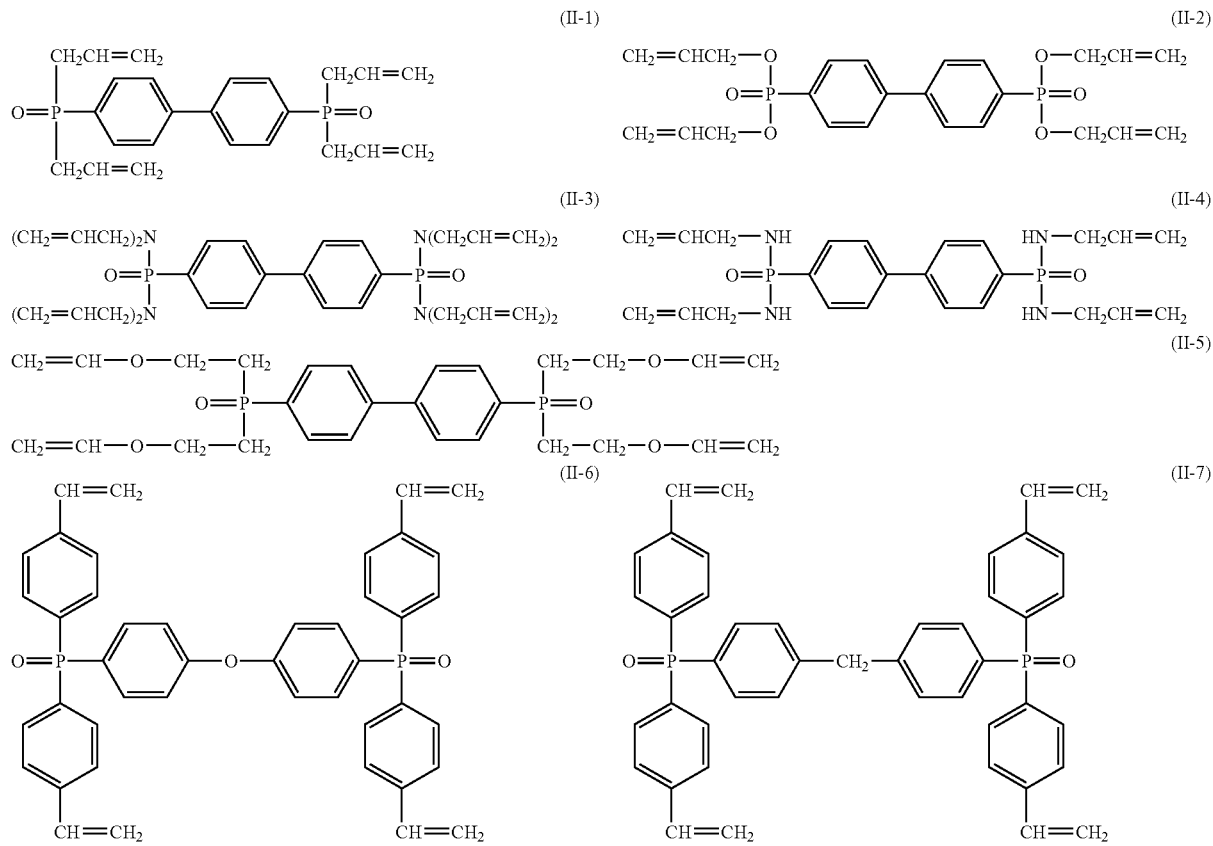

[C9]
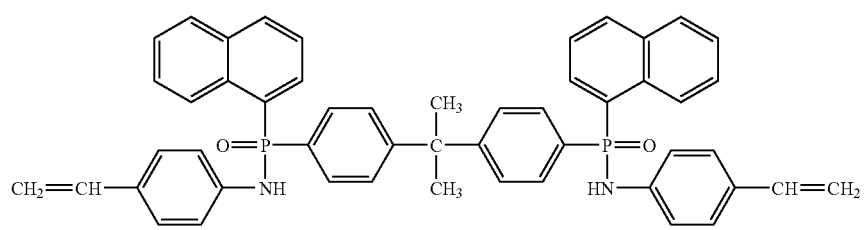
(II-8)
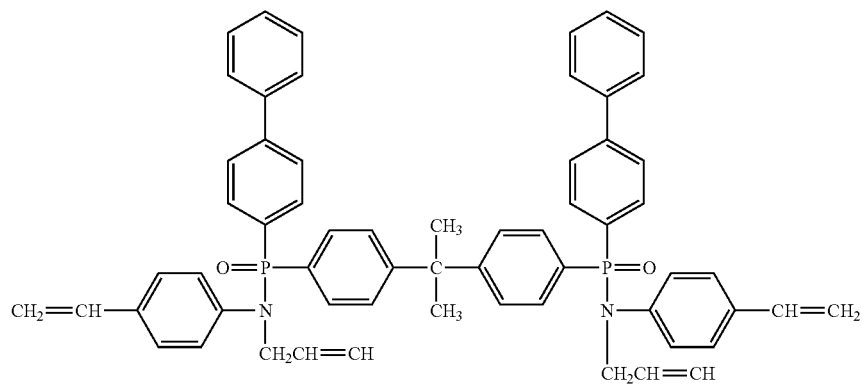
(II-9)
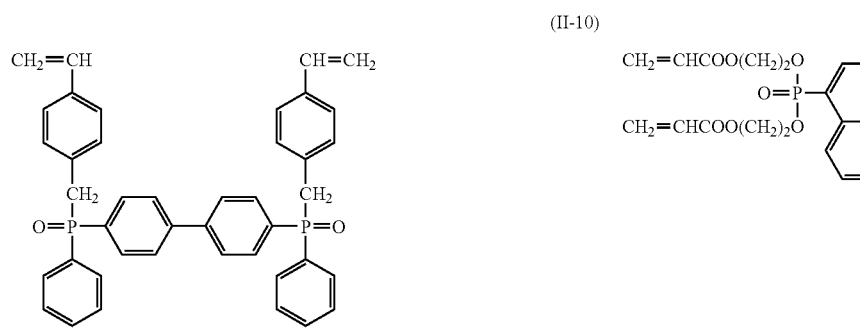
(II-10)
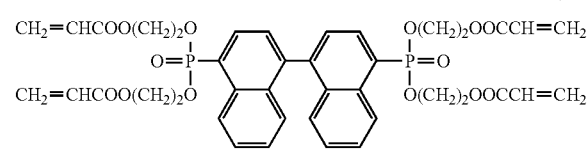
(II-11)
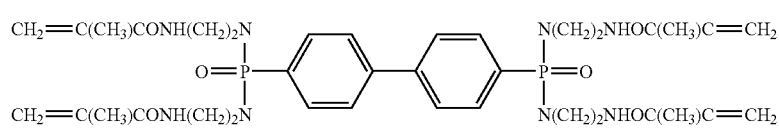
(II-12)
[C10]
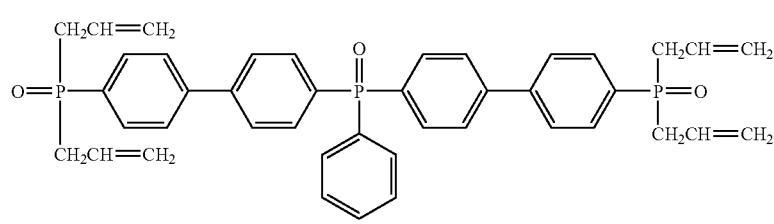
(II-13)
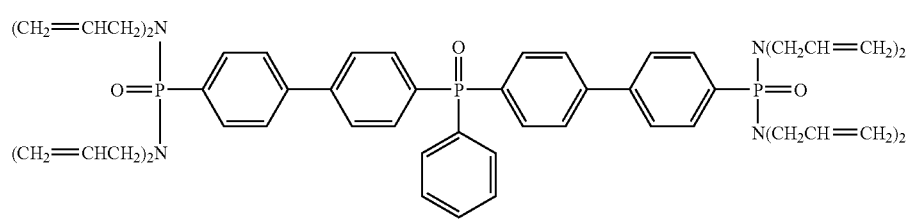
(II-14)

-continued
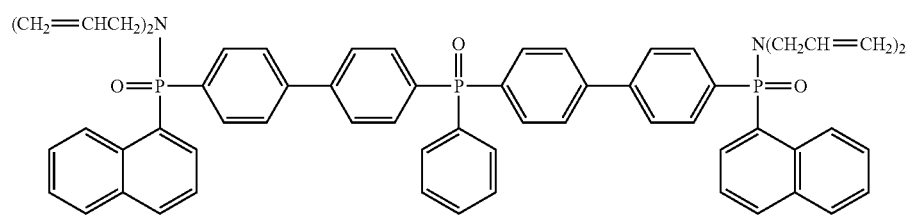
(II-15)
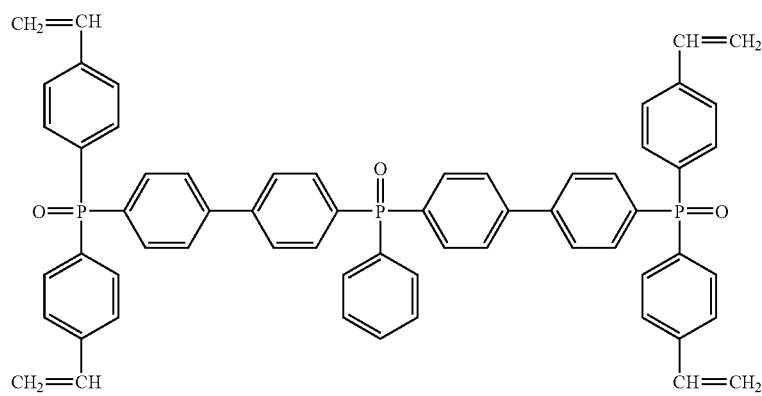
(II-16)
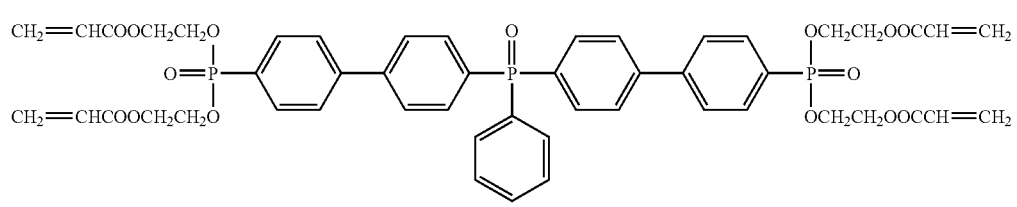
(II-17)
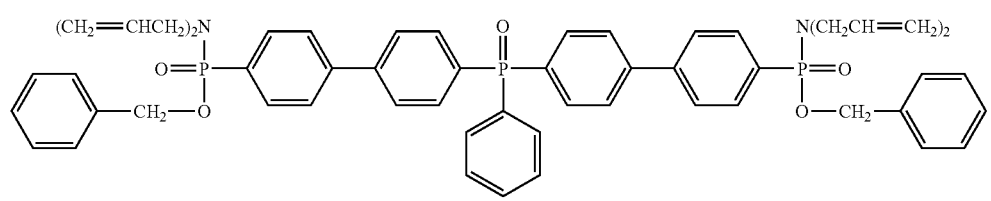
(II-18)
[C11]
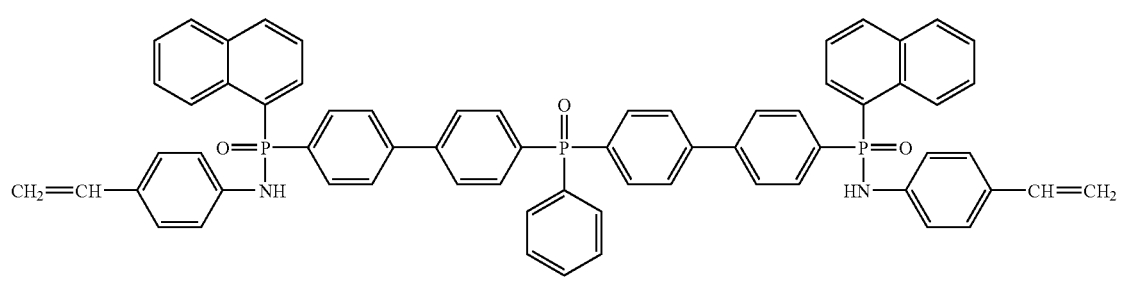
(II-19)
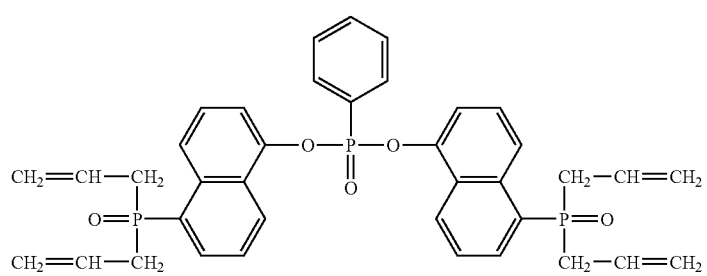
(II-20)

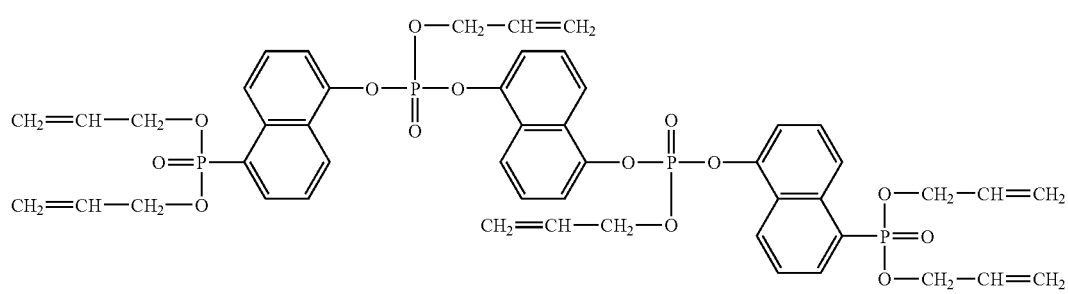

(II-21)

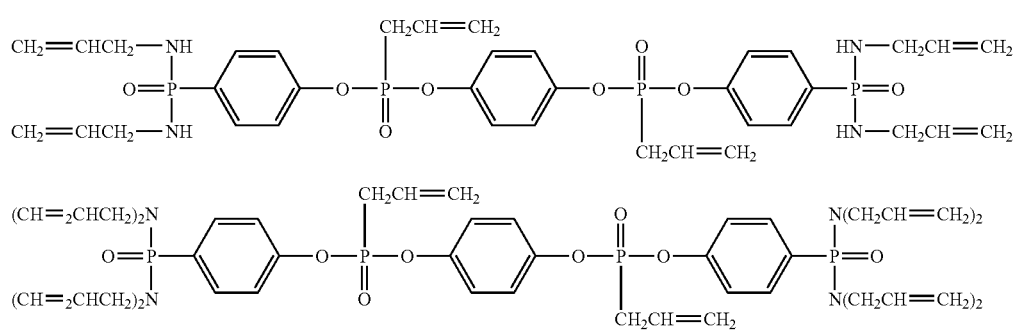

(II-22)

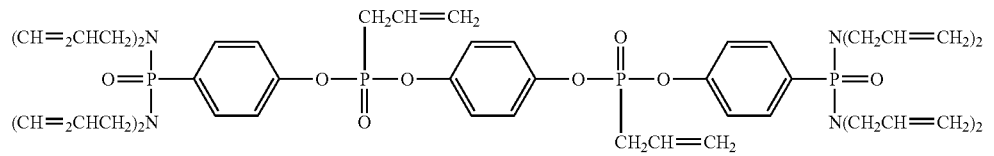

(II-23)

The compounds cited above can be synthesized, for example, by the method described in WO 2005/087852. For example, compound (II-1) can be synthesized starting from 4,4'-dichlorobiphenyl; this is reacted with phosphorus oxychloride, followed by reaction with allyl bromide to introduce the terminal unsaturated groups.

The reactive cyclic nitrogenous compound (b3) is a cyclic nitrogenous compound that has at least two unsaturated groups at the terminals thereof. The group having an unsaturated group at the terminal thereof is specifically exemplified by diacrylate, dimethacrylate, diallylate, triacrylate, trimethacrylate, triallylate, tetraacrylate, tetramethacrylate, tetraallylate, and so forth, wherein acrylates such as diacrylate, triacrylate, tetraacrylate, and so forth are more preferred from a reactivity standpoint. The cyclic nitrogenous compound is exemplified by the isocyanuric ring, the cyanuric ring, and so forth.

The reactive cyclic nitrogenous compound (b3) can be specifically exemplified by derivatives of the aforementioned cyanuric acid or isocyanuric acid, e.g., multifunctional monomers and oligomers such as EO-modified isocyanurate diacrylate, EO-modified isocyanurate triacrylate, triisocyanuric triacrylate, and so forth.

The crosslinking agent (B) content in the resin composition of the present invention is preferably 0.5 to 20 mass % and more preferably is 0.5 to 7.0 mass %.

When reactive organophosphorus compound (b1) and/or reactive organophosphorus compound (b2) is or are used as crosslinking agent (B), their content in the resin composition is preferably 0.5 to 20 mass % and more preferably is 4 to 12 mass %. When the content of this reactive organophosphorus compound is less than 0.5 mass %, almost no increase in the flame retardancy can be obtained; in addition, the resin composition has a poor crosslink density and almost no increase can then be brought about in physical properties such as the strength, pressure resistance, and heat resistance. At above 20 mass % the reactive organophosphorus compound is present in excess, which results in the generation of a decomposition gas from the organophosphorus compound and/or in the generation of unreacted organophosphorus compound monomer, and which can also create the risk that oligomerized reactive organophosphorus compound will bleed out.

When a reactive cyclic nitrogenous compound (b3) is used as the crosslinking agent (B), its content in the resin composition is preferably 0.5 to 7 mass %. When the content of this reactive cyclic nitrogenous compound (b3) is less than 0.5 mass %, almost no increase in the flame retardancy can be obtained; in addition, the resin composition has a poor crosslink density and almost no increase can then be brought about in physical properties such as the strength, pressure resistance, and heat resistance. At above 7 mass % the reactive cyclic nitrogenous compound is present in excess, which results in the generation of a decomposition gas from the reactive cyclic nitrogenous compound and/or in the generation of its unreacted monomer, and which can also create the risk that the oligomerized species will bleed out.

The Metal Hydroxide (C)

The resin composition used for the arc-extinguishing processed resin article of the present invention contains a metal hydroxide (C) whose surface has been treated with a higher aliphatic acid. This higher aliphatic acid-surface treated metal hydroxide (C) has an excellent compatibility with, and dispersibility in, resins (particularly polyolefin resins) and for this reason can be readily dispersed to uniformity in the resin composition by melt-mixing/kneading.

The metal hydroxide is not particularly limited with regard to type and can be exemplified by magnesium hydroxide, aluminum hydroxide, calcium hydroxide, and so forth. Magnesium hydroxide is particularly preferred among these because it has the ability in the dehydration reaction that occurs during pyrolysis to produce a pyrolysis gas that has a high content of hydrogen gas, $H_2O$, $O_2$, and O.

The metal hydroxide preferably has a particle size of 1 to 10 μm. This provides a better compatibility with, and dispersibility in, the resin.

The higher aliphatic acid used to treat the surface of the metal hydroxide is preferably a $C_{12-20}$ aliphatic acid and more preferably is a $C_{15-18}$ aliphatic acid. Specific examples are stearic acid, oleic acid, linoleic acid, and so forth. Stearic acid is preferred thereamong because its boiling point is at least as high as the molding temperature.

This higher aliphatic acid-surface treated metal hydroxide (C) may be a commercially available material, for example, "Magseeds N-4" available from Konoshima Chemical Co., Ltd.

The content of the metal hydroxide (C) is 5 to 60 mass parts and more preferably 7 to 20 mass parts per 100 mass parts of the polyolefin resin (A). Almost no improvement in the arc-extinguishing performance can be obtained when the content of the metal hydroxide (C) is less than 5 mass parts per 100 mass parts polyolefin resin (A). At more than 60 mass parts, the increase in the amount of pyrolysis gas generation sets up a trend of increasing internal pressure within the arc-extinguishing device; in addition, the molding processability of the resin composition may also be impaired.

The Inorganic Filler (D)

The resin composition used for the arc-extinguishing processed resin article of the present invention preferably contains at least one inorganic filler (D) selected from reinforcing fiber, barium titanate whiskers, microparticulate silica gel, boehmite, talc, and magnesium carbonate. The presence of the inorganic filler brings about an increase in the strength, pressure resistance, and heat resistance of the arc-extinguishing processed resin article and can also bring about an improvement in the dimensional stability.

The aforementioned reinforcing fiber can be exemplified by glass fiber, carbon fiber, and metal fiber wherein the use of glass fiber is preferred from a strength standpoint and from the standpoint of the adhesiveness between the resin and the inorganic filler. A single such reinforcing fiber may be used or two or more may be used in combination. The reinforcing fiber may also be treated with a known surface-treatment agent, for example, a silane coupling agent. Glass fiber is preferably subjected to a surface treatment and also coated with resin. This can provide additional improvements in the adhesiveness with the resin.

The inorganic filler (D) content in the resin composition is preferably 1 to 40 mass % and more preferably is 20 to 40 mass %. Almost no effect from the inorganic filler is obtained when the inorganic filler (D) content is less than 1 mass %, while the arc-extinguishing performance is poor at more than 40 mass % due to a decline in the amount of pyrolysis gas generation.

Other Components

The resin composition used for the arc-extinguishing processed resin article of the present invention preferably also contains polyacetal resin. The use of the polyolefin resin (A) in combination with polyacetal resin makes it possible to increase the arc-extinguishing performance without impairing the molding processability of the resin composition and also makes it possible to inhibit the internal pressure rise within the arc-extinguishing device during an arc extinction event.

This polyacetal resin contains preferably 75 to 100 mole % and more preferably 80 to 100 mole % repeat unit derived from oxymethylene. The arc-extinguishing performance is poor and the arc cannot be extinguished rapidly when the content of this repeat unit is less than 75 mole %.

This polyacetal resin is preferably an oxymethylene-oxyethylene copolymer or an oxymethylene polymer, and oxymethylene-oxyethylene copolymer or oxymethylene polymer is particularly preferred because this affords an excellent arc-extinguishing performance. However, polyoxyethylene provides a poor arc-extinguishing performance.

The content of the polyacetal resin is preferably 1 to 40 mass parts and more preferably 2 to 25 mass parts per 100 mass parts of the polyolefin resin (A). When the polyacetal resin content is less than 1 mass part per 100 mass parts polyolefin resin (A), the effect due to the polyacetal resin is weak and almost no improvement in the arc-extinguishing performance can be obtained. When this proportion exceeds 40 mass parts, the increase in the amount of pyrolysis gas generation sets up a trend of increasing internal pressure within the arc-extinguishing device.

In addition to the preceding, the resin composition used for the arc-extinguishing processed resin article of the present invention may also contain—within a range that does not significantly impair the properties such as heat resistance, pressure resistance, arc-extinguishing performance, and strength that are an object of the present invention—the various commonly used additive components, for example, additives such as crystal nucleating agents, colorants, oxidation inhibitors, release agents, plasticizers, heat stabilizers, lubricants, ultraviolet stabilizers, and so forth.

The Arc-Extinguishing Processed Resin Article

The arc-extinguishing processed resin article of the present invention is obtained by molding the hereinabove-described resin composition and thereafter exposing it to radiation.

Heretofore known methods are used for the method of molding the resin composition; for example, molding may be carried out by melt-mixing/kneading and pelletizing the resin composition followed by molding by a known method such as injection molding, extrusion molding, vacuum molding, inflation molding, and so forth. The melt-mixing/kneading can be carried out using an ordinary melt-mixing/kneading device such as a single-screw or twin-screw extruder, Banbury mixer, kneader, mixing roll, and so forth. The mixing/kneading temperature is preferably 170 to 230° C. It is difficult to carry out melt-mixing/kneading at below 170° C., while above 230° C. there is a risk of dissociating the hydroxyl group in the resin composition and thereby reducing the arc-extinguishing performance.

When a resin composition that contains polyacetal resin is employed, a preferred sequence comprises melt-mixing/kneading at 180 to 220° C. under an inert atmosphere and thereafter molding and cooling to 40 to 60° C. By carrying out molding in this manner, a resin molding is obtained that has a microphase-separated structure in which the polyacetal resin is dispersed in the polyolefin resin (A) at the submicron (0.1 to 0.9 μm) level in a configuration ranging from a sea-island configuration to an hexagonal cylinder configuration to a lamellar configuration. The generation of this microphase-separated structure facilitates thermal decomposition of the polyacetal resin and enables the release of a strongly arc-extinguishing pyrolysis gas and as a result can improve the arc-extinguishing performance and can bring about an even more rapid arc extinction.

Moreover, since crosslinking is completely undeveloped at this stage, the surplus spool component from the molding process can be recycled.

The arc-extinguishing processed resin article of the present invention can be obtained by exposing the resin molding obtained in the manner described to radiation. The microphase-separated structure cited above can be fixed or made permanent by the crosslinking reaction that is induced by the exposure to radiation.

For example, α-radiation, γ-radiation, X-rays, ultraviolet radiation, and so forth can be used as the radiation directed onto the resin molding, wherein γ-radiation is preferred because it has a strong transmissivity that enables a uniform irradiation to occur.

The irradiation dose of the radiation is preferably at least 10 kGy and more preferably is 10 to 45 kGy. Crosslinking within this range yields an arc-extinguishing processed resin article that exhibits excellent properties, i.e., heat resistance, pressure resistance, arc-extinguishing performance, and strength. The crosslinking-induced formation of a three-dimensional network structure will be nonuniform at an irradiation dose below 10 kGy and creates the potential for bleed out of unreacted crosslinking agent. At above 45 kGy, internal strain remains in the processed resin article due to oxidative degradation products, and this creates the potential for deformation and shrinkage.

The arc-extinguishing processed resin article of the present invention obtained in the described manner exhibits an excellent strength, pressure resistance, heat resistance, and arc-extinguishing performance and is well qualified for use as an arc-extinguishing device in a circuit breaker.

The Circuit Breaker

The circuit breaker of the present invention is described below.

The circuit breaker of the present invention comprises a stationary contactor that has a stationary contact point, a movable contactor that has a movable contact point capable of contacting the stationary contactor and that carries out a switching operation with the stationary contactor, and an arc-extinguishing device that extinguishes the arc generated when the stationary contactor and movable contactor engage in a switching operation, wherein the arc-extinguishing device comprises the arc-extinguishing processed resin article described hereinabove.

Figure 2:
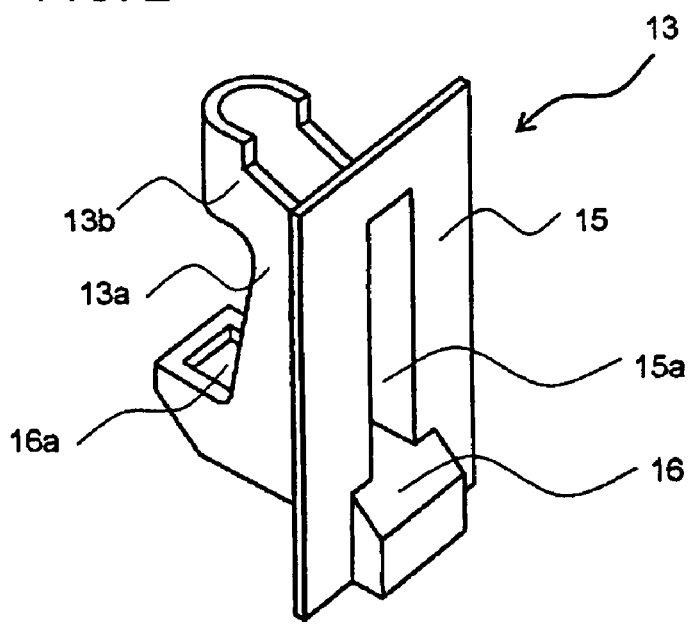
FIG. 2 is a perspective view of the arc-extinguishing chamber used in the circuit breaker of FIG. 1.
Figure 3:
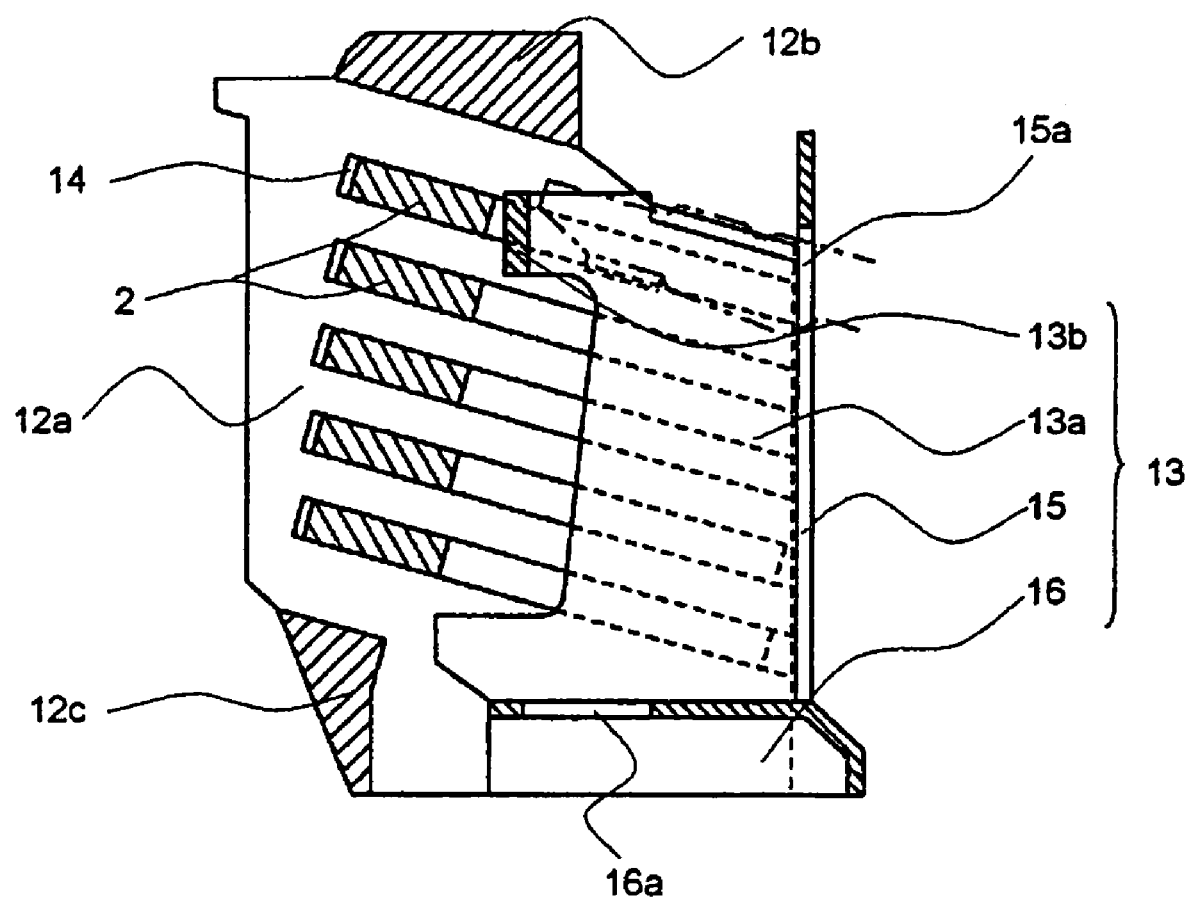
FIG. 3 is a cross-sectional view of the same arc-extinguishing chamber in the same circuit breaker.

A specific example of this circuit breaker is illustrated in FIGS. 1 to 3. FIG. 1 is a cutaway drawing of the circuit breaker in perspective view; FIG. 2 is a perspective view of the arc-extinguishing chamber; and FIG. 3 is a cross-sectional drawing of the circuit breaker.

In FIG. 1, a stationary contactor 5 is integrally formed with a power supply side terminal 4, and the distal end of this stationary contactor 5 is folded back in a U-shape so as to lie along a movable contactor 1. A stationary contact point 7 is provided at the end of this folded-back region 5a; this stationary contact point 7 can contact movable contact point 6 of movable contactor 1. In addition, arc horn 9 is disposed on stationary contactor 5; this arc horn 9 guides the arc generated between movable contact point 6 and stationary contact point 7 toward the arc-extinguishing device.

The arc-extinguishing device comprises grid 2 and arc-extinguishing chamber 13. A plurality of grids 2 (5 in the drawing) are stacked at a prescribed interval in insulator body 12, and movable contactor 1 is structured to pass through V-shaped notches 2a formed in grids 2 to thereby carry out a switching operation between the closed position (shown by the solid line in FIG. 1) and the open position (shown by the chain line in FIG. 1). Arc-extinguishing chamber 13 is disposed between movable contactor 1 and the grids 2; arc-extinguishing chamber 13 is formed of the arc-extinguishing processed resin article of the present invention as described above.

In FIGS. 1 and 3, insulator body 12 comprises a pair of side walls 12a (left and right) and connection members 12b and 12c that at their bottom and top connect side walls 12a to each other, and is molded as a single article of arc-resistant melamine-type molding resin. Multiple flights of slots 14 with a rectangular cross section are formed in the opposing surfaces of the left and right side walls 12a; slots 14 are formed with a gradually upward inclination from the load side edge of side walls 12a (the right side edge in FIG. 3). Grids 2 are pressed into slots 14 so as extend between the right and left side walls 12a.

Arc-extinguishing chamber 13 comprises a pair of side walls 13a (left and right) and a front wall 13b that runs in an arc shape along notches 2a of grids 2 between the upper edges of the left and right side walls 13a. The following are also integrally formed into the arc-extinguishing chamber 13: partition wall 15 that partitions the arc-extinguishing device from the switching mechanism and an insulating cover 16 that covers the upper side of the stationary contactor 5. Partition wall 15 is provided with slit 15a that runs along the switching operation path of movable contactor 1, while insulating cover 16 is provided with window aperture 16a that exposes stationary contact point 7. Arc-extinguishing chamber 13 inserts into the interior of insulator body 12 from the right side of FIG. 3 in such a manner that partition wall 15 comes into contact with the edges of side walls 12a of the insulator body and is supported on stationary contactor 5 through insulating cover 16 and is fixed by pressing by the main cover (not shown) of the circuit breaker. In this state, side walls 13a of arc-extinguishing chamber 13 cover, from the inside, both leg regions (both side regions of the notches 2a) of grids 2 that lie on the two sides of movable contactor 1, and front wall 13b is, as shown in FIG. 3, positioned in the depth of notch 2a of uppermost grid 2.

In the structure described above, an arc is generated between movable contact point 6 and stationary contact point 7 during a current interruption event and this arc is drawn into grid 2 and is extinguished. At this time, the two leg regions of the grids 2 are covered on their inside by the side walls 13a of the arc-extinguishing chamber 13 comprising the arc-extinguishing processed resin article of the present invention and are thus isolated from the arc, thereby stopping the melting and broadcasting of this member by the arc. In addition, there is generated—from side walls 13a in proximity to the arc—a pyrolysis gas that has a high content of hydrogen gas, $H_2O$, $O_2$, and O and that contains minimal amount of a component that makes a weak contribution to arc extinction, e.g., a tar fraction; because of this, arc cooling is promoted and arc extinction occurs rapidly.

EXAMPLES

Example 1

The following were mixed and then mixed/kneaded at 220° C. using a sideflow twin-screw extruder (from The Japan Steel Works) to obtain resin pellets: 55 mass parts polyolefin resin containing 0.58 mole hydroxyl group per mole methylene group (EVAL-L104B, trade name, from Kuraray Co., Ltd.), 20 mass parts polyoxymethylene-oxyethylene copolymer having a 90 mole % content of repeat unit derived from oxymethylene (Tenac C 4520, trade name, from Asahi Kasei Corporation), 5 mass parts TAIC as crosslinker (TAIC, trade name, from Nippon Kasei Chemical Co., Ltd.), and 20 mass parts magnesium hydroxide as the metal hydroxide (Magseeds N-4, trade name, from Konoshima Chemical Co., Ltd.). The resin pellets were then dried for 7 hours at 80° C. and were thereafter molded at a resin temperature of 215° C. and a die temperature of 50° C. using an injection molder (from FANUC Ltd.: α50C). When the cross-sectional state of this molding was observed by SEM, a microphase-separated state that formed a uniform sea-island structure with lamellar spherulites was seen.

This molding was then exposed to 25 kGy of γ-radiation sourced from cobalt-60 to obtain the arc-extinguishing processed resin article of Example 1. When the cross-sectional state of this arc-extinguishing processed resin article was observed by SEM, a microphase-separated state that formed a uniform sea-island structure with lamellar spherulites was seen.

Example 2

The following were mixed and then mixed/kneaded at 220° C. using a sideflow twin-screw extruder (from The Japan Steel Works) to obtain resin pellets: 45 mass parts polyolefin resin containing 0.58 mole hydroxyl group per mole methylene group (EVAL-L104B, trade name, from Kuraray Co., Ltd.), 15 mass parts polyoxymethylene-oxyethylene copolymer having a 90 mole % content of repeat unit derived from oxymethylene (Tenac C 4520, trade name, from Asahi Kasei Corporation), 20 mass parts magnesium hydroxide as the metal hydroxide (Magseeds N-4, trade name, from Konoshima Chemical Co., Ltd.), 15 mass parts silane-treated glass fiber ("03. JAFT2Ak25", trade name, from Asahi Fiberglass) as inorganic filler, and 5 mass parts of the compound with the preceding formula (I-18) as a reactive organophosphorus flame retardant. The resin pellets were then dried for 7 hours at 80° C. and were thereafter molded at a resin temperature of 215° C. and a die temperature of 50° C. using an injection molder (from FANUC Ltd.: α50C). When the cross-sectional state of this molding was observed by SEM, a microphase-separated state that formed a uniform sea-island structure with lamellar spherulites was seen.

This molding was then exposed to 25 kGy of γ-radiation sourced from cobalt-60 to obtain the arc-extinguishing processed resin article of Example 2. When the cross-sectional state of this arc-extinguishing processed resin article was observed by SEM, a microphase-separated state that formed a uniform sea-island structure with lamellar spherulites was seen.

Example 3

The following were mixed and then mixed/kneaded at 220° C. using an $N_2$ gas-substituted sideflow twin-screw extruder (from The Japan Steel Works) to obtain resin pellets: 43 mass parts polyolefin resin containing 0.58 mole hydroxyl group per mole methylene group (EVAL-L104B, trade name, from Kuraray Co., Ltd.), 20 mass parts polyoxymethylene-oxyethylene copolymer having a 90 mole % content of repeat unit derived from oxymethylene (Tenac C 4520, trade name, from Asahi Kasei Corporation), 15 mass parts magnesium hydroxide as the metal hydroxide (Magseeds N-4, trade name, from Konoshima Chemical Co., Ltd.), 15 mass parts boehmite (BMT-10, trade name, from Kawai Lime Industrial Co., Ltd.) as inorganic filler, and 7 mass parts of the compound with the preceding formula (II-3) as a reactive organophosphorus flame retardant. The resin pellets were then dried for 7 hours at 80° C. and were thereafter molded at a resin temperature of 215° C. and a die temperature of 50° C. under N2 atmosphere using an injection molder (from FANUC Ltd.: α50C). When the cross-sectional state of this molding was observed by SEM, a microphase-separated state that formed a uniform sea-island structure with lamellar spherulites was seen.

This molding was then exposed to 25 kGy of γ-radiation sourced from cobalt-60 to obtain the arc-extinguishing processed resin article of Example 3. When the cross-sectional state of this arc-extinguishing processed resin article was observed by SEM, a microphase-separated state that formed a uniform sea-island structure with lamellar spherulites was seen.

Comparative Example 1

Resin pellets were obtained by mixing/kneading under the same conditions as in Example 1, with the exception that the crosslinking agent used in Example 1 was not incorporated. The obtained resin pellets were then dried for 7 hours at 80° C. and were thereafter molded at a resin temperature of 215° C. and a die temperature of 50° C. using an injection molder (from FANUC Ltd.: α50C) to obtain the arc-extinguishing processed resin article of Comparative Example 1.

Comparative Example 2

Resin pellets were obtained by mixing/kneading under the same conditions as in Example 2, with the exception that the reactive organophosphorus flame retardant (I-18) used in Example 2 was not incorporated. The obtained resin pellets were then dried for 7 hours at 80° C. and were thereafter molded at a resin temperature of 215° C. and a die temperature of 50° C. using an injection molder (from FANUC Ltd.: α50C) to obtain the arc-extinguishing processed resin article of Comparative Example 2.

Comparative Example 3

The arc-extinguishing processed resin article of Comparative Example 3 was obtained as in Example 2, with the exception that a polyethylene resin (HJ362, trade name, from Japan Polyethylene Corporation) was used in place of the polyolefin resin containing 0.58 mole hydroxyl group per mole methylene group (EVAL-L104B, trade name, from Kuraray Co., Ltd.) that was used in Example 2.

Comparative Example 4

Resin pellets were obtained by mixing/kneading under the same conditions as in Example 3, with the exception that the reactive organophosphorus flame retardant (II-3) used in Example 3 was not incorporated. The obtained resin pellets were then dried for 7 hours at 80° C. and were thereafter molded at a resin temperature of 215° C. and a die temperature of 50° C. using an injection molder (from FANUC Ltd.: α50C) to obtain the arc-extinguishing processed resin article of Comparative Example 4.

Comparative Example 5

While mixing/kneading 25 mass parts unsaturated polyester resin (7527, trade name, from U-PICA Co., Ltd.), 335 mass parts Al(OH), 5 mass parts styrene-vinyl acetate copolymer, 0.3 mass part t-butyl peroxide Z as polymerization initiator, and 4.7 mass parts viscosity regulator with a kneader, 35 mass parts silane-treated glass fiber ("03. JAFT2Ak25", trade name, from Asahi Fiberglass) as inorganic filler was added and dispersed to obtain a bulk molding compound. This bulk molding compound was molded and polymerized at 140 to 150° C. to obtain the arc-extinguishing processed resin article of Comparative Example 5.

The molding processability was evaluated for the arc-extinguishing processed resin articles in Examples 1 to 3 and Comparative Examples 1 to 5. In addition, short-circuit testing, heat resistance testing, and flame retardancy testing were carried out using these arc-extinguishing processed resin articles as the arc-extinguishing chamber 13 in the circuit breaker of FIG. 1.

In the short-circuit test, current (3-phase 440 V/50 kA) was applied in the closed condition; the movable contactor was separated to generate an arc current; and the interrupt ability (arc-extinguishing performance) of this arc current, the presence/absence of damage to the arc-extinguishing device (internal pressure behavior), and the surface condition (heat resistance) were observed. A score of "pass" was rendered for the interrupt ability when the short-circuit current was interrupted.

For the molding processability, the presence/absence during molding of problems such as foaming, drooling, and so forth, was visually evaluated and a score of "pass" was rendered when these problems could not be visually detected.

For the flame retardancy, a test specimen (length=5 inch, width=½ inch, thickness=3.2 mm) was fabricated in accordance with the UL-94 test; the test specimen was hung vertically; and the combustion time after contact for 10 seconds with a Bunsen burner flame was recorded. After flame extinction, a second 10-second flame contact was carried out and the combustion time after flame contact was again recorded. Evaluation was carried out in accordance with the UL-94 test based on the total of the combustion times, the glowing combustion time after the second flame extinction, and the presence/absence of dripped material that ignited cotton.

For the metal contamination, the contact resistance was measured after holding for 300 hours in a 120° C. ambient, and a score of "pass" was rendered with the value of the contact resistance was no greater than 50 mΩ.

The results of these tests are given in Table 1.

TABLE 1

| | short-circuit test | | | | | |
| --- | --- | --- | --- | --- | --- | --- |
| | Interrupt ability (arc-extinguishing performance) | damage (internal pressure behavior) | heat resistance (surface condition) | molding processability | flame retardancy (UL-94) | metal contamination |
| Example 1 | pass (excellent interrupt performance) | pass (no damage) | excellent surface | excellent | V-0 | pass |
| Example 2 | pass (excellent interrupt performance) | pass (no damage) | excellent surface | excellent | V-0 | pass |
| Example 3 | pass (excellent interrupt performance) | pass (no damage) | excellent surface | excellent | V-0 | pass |
| Comparative Example 1 | pass (excellent interrupt performance) | damage occurred | excellent surface | excellent | HB | pass |
| Comparative Example 2 | pass (excellent interrupt performance) | damage occurred | excellent surface | excellent | V-0 | pass |
| Comparative Example 3 | does not pass | damage occurred | excellent surface | excellent | HB | pass |
| Comparative Example 4 | pass (excellent interrupt performance) | damage occurred | excellent surface | excellent | V-0 | does not pass |
| Comparative Example 5 | pass (excellent interrupt performance) | damage occurred | excellent surface | poor (burring occurred) | V-1 | pass |

Based on the results given above, the arc-extinguishing processed resin articles of Examples 1 to 3 had an excellent flame retardancy, heat resistance, and molding processability; circuit breakers that used arc-extinguishing devices comprising these arc-extinguishing processed resin articles could very efficiently extinguish the arc generated from the contact points during a current interruption event; and damage to the arc-extinguishing chamber during arc extinction was not seen.

Thus, a fire-retardant arc-extinguishing processed resin article has been described according to the present invention.

Many modifications and variations may be made to the techniques and structures described and illustrated herein without departing from the spirit and scope of the invention. Accordingly, it should be understood that the devices and methods described herein are illustrative only and are not limiting upon the scope of the invention.

This application is based on and claims priority to Japanese Patent Application 2008-028577, filed on Feb. 8, 2008. The disclosure of the priority application in its entirety, including the drawings, claims, and the specification thereof, is incorporated herein by reference.

What is claimed is:

1. An arc-extinguishing processed resin article obtained by:
molding a resin composition comprising (A) polyolefin resin that has the hydroxyl group substituted for a portion of hydrogen atoms in the methylene chain and that contains 0.2 to 0.7 mole hydroxyl group per mole methylene group, (B) a crosslinking agent that has a terminal unsaturated group, and (C) metal hydroxide whose surface has been treated with higher aliphatic acid, wherein the resin composition contains 5 to 60 mass parts of the metal hydroxide (C) per 100 mass parts of the polyolefin resin (A); and
executing radiation-induced crosslinking on the resin composition after molding.

2. The arc-extinguishing processed resin article according to claim 1, wherein the metal hydroxide (C) is magnesium hydroxide.

3. The arc-extinguishing processed resin article according to claim 1, wherein the higher aliphatic acid used to treat the surface of the metal hydroxide (C) is a $C_{12-20}$ aliphatic acid.

4. The arc-extinguishing processed resin article according to claim 1, wherein the latent heat of decomposition of the polyolefin resin (A) is at least 30 cal/g.

5. The arc-extinguishing processed resin article according to claim 1, wherein the polyolefin resin (A) is an ethylene-vinyl alcohol copolymer.

6. The arc-extinguishing processed resin article according to claim 1, wherein the crosslinking agent (B) comprises an organophosphorus compound as shown by formula (I) and/or (II) below and the resin composition contains 0.5 to 20 mass % of organophosphorus compound [C 1] or [C 2]:

[C1]

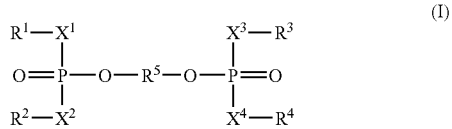
(I)

wherein, in formula (I), $R^1$ to $R^4$ each represent CH2=CY1-Y2- or a possibly heteroatom-containing monovalent aromatic hydrocarbon group; $R^5$ represents a possibly heteroatom-containing divalent aromatic hydrocarbon group; $X^1$ to $X^4$ each represent a group selected from —O—, —NH—, and —(CH2=CY1-Y2)N—, and at least one of $X^1$ to $X^4$ comprises —NH— or —(CH2=CY1-Y2)N—; at least two of $R^1$ to $R^4$ and $X^1$ to $X^4$ comprise CH2=CY1-Y2-; Y1 represents hydrogen or methyl; Y2 represents C1-5 alkylene or —COO—Y3-; and Y3 represents C1-5 alkylene

[C2]

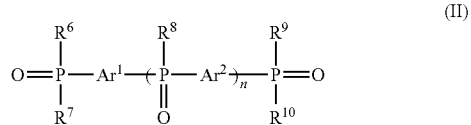
(II)

wherein, in formula (II), at least one P—C bond is present per molecule; $Ar^1$ and $Ar^2$ each represent a divalent aromatic hydrocarbon group that has no more than 20 carbons and that does not contain mobile hydrogen; n is an integer from 0 to 2; $R^6$ to $R^{10}$ each represent a group selected from —NHCH2CH=CH2, —N(CH2CH=CH2)2, —OCH2CH=CH2, —CH2CH=CH2, —CH2CH2OCH=CH2, —(C6H4)-CH=CH2, —O(C6H4)-CH=CH2, —CH2(C6H4)-CH=CH2, —NH(C6H4)-CH=CH2, —N(CH2CH=CH2)-(C6H4)-CH=CH2, —O—R—OOC—C(R')=CH2, —NH—R—NHCO—C(R')=CH2, and aryl having no more than 12 carbons; R represents C2-5 alkylene; R'represents hydrogen or methyl; and at least two of R6 to R10 comprise —CH=CH2 or —C(CH3)=CH2.

7. The arc-extinguishing processed resin article according to claim 1, wherein the crosslinking agent (B) contains a flame retardant comprising a cyclic nitrogenous compound that has at least two unsaturated groups at the terminals thereof and the resin composition contains 0.5 to 7 mass % of this nitrogenous compound.

8. The arc-extinguishing processed resin article according to claim 1, wherein the resin composition contains 1 to 40 mass % of at least one inorganic filler (D) selected from reinforcing fibers, barium titanate whiskers, microparticulate silica gel, boehmite, talc, and magnesium carbonate.

9. A circuit breaker, comprising:
a stationary contactor that has a stationary contact point,
a movable contactor that has a movable contact point contacting the stationary contactor, said movable contactor carrying out a switching operation with the stationary contactor, and
an arc-extinguishing device that extinguishes the arc generated when the stationary contactor and movable contactor engage in a switching operation, wherein the arc-extinguishing device comprises an arc-extinguishing processed resin article according to claim 1.

* * * * *